United States Patent Office.

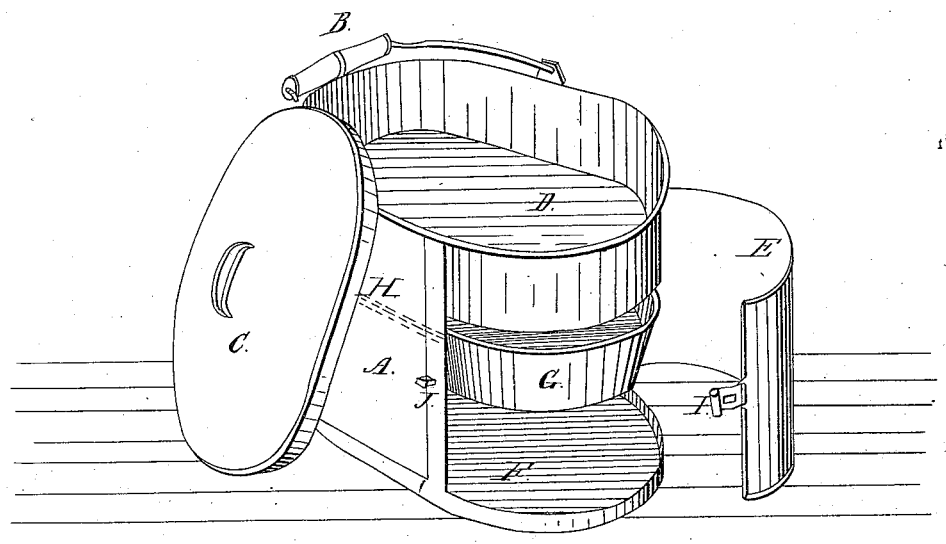

JOEL HAINES, OF WEST MIDDLEBURG, OHIO.

*Letters Patent No. 62,842, dated March 12, 1867.*

---

IMPROVED DINNER BUCKET.

---

*The Schedule referred to in these Letters Patent and making part of the same.*

---

TO ALL WHOM IT MAY CONCERN:

Be it known that I, JOEL HAINES, of West Middleburg, Logan county, State of Ohio, have invented certain new and useful improvements in Victual and Provision Buckets, for carrying food, &c.; and I do hereby declare the following description and accompanying drawings are sufficient to enable any person skilled in the art or science to which it most nearly appertains to make and use my said invention or improvements without further invention or experiment.

The nature of my invention and improvements consists in a victual and provision bucket made with a double bottom, or permanent horizontal partition, to divide it into two apartments, one above the other, with a door in the side of the bucket opening into the lower division or apartment; also, in arranging cleats on the sides of the lower apartment to support pans or trays.

In the accompanying drawings, A is the outside of the bucket; B the handle or bail; C the cover, and D the bottom of the upper apartment, (or permanent horizontal partition.) E is a door, hinged to the side, to close the opening into the lower apartment, which has a bottom, F, to hold whatever may be put upon it. I make pans or trays, G, to fit this lower apartment, and fasten cleats on the sides to hold one above another, as shown at H by dotted lines. The door E has a hasp, I, to catch on the staple J to hold the door, and it may be further secured by a padlock when desired. My improved bucket may be made of tin or sheet metal, for children and laborers to carry their meals in; and large ones may be made of wooden staves, and hooped, to carry butter, eggs, fruit, etc., to market. The pan or tray G in the drawing is made flaring, or largest at the top, and has a flange around the outside upper edge that catches on the cleats that hold it up. But the pans may be made the same size at the bottom that they are at the top, so that the lower outside corners may rest on the cleats, or they may be made to rest one on the top of another if preferred that way.

I claim a victual and provision bucket made with a double bottom, or permanent horizontal partition, to divide it into two apartments, one above the other, with a door in the side of the bucket opening into the lower division or apartment, substantially as described.

I also claim the cleats in the lower apartment in combination with the pans or trays.

JOEL HAINES.

Witnesses:
  ISRAEL POOL,
  WM. P. HAINES.